US008542846B2

(12) United States Patent
Matejczyk et al.

(10) Patent No.: US 8,542,846 B2
(45) Date of Patent: Sep. 24, 2013

(54) VEHICLE SOUND ENHANCING SYSTEM AND METHOD OF PRODUCING

(76) Inventors: John Lloyd Matejczyk, Oakland, CA (US); John Hart Miller, Aurora, CO (US)

( * ) Notice: Subject to any disclaimer, the term of this patent is extended or adjusted under 35 U.S.C. 154(b) by 1059 days.

(21) Appl. No.: 11/710,158

(22) Filed: Feb. 23, 2007

(65) Prior Publication Data
US 2008/0205232 A1 Aug. 28, 2008

(51) Int. Cl.
*H04B 1/00* (2006.01)
(52) U.S. Cl.
USPC .............. 381/86; 381/302; 381/71.4; 381/92
(58) Field of Classification Search
USPC .............. 381/61, 64, 322, 71, 302, 86, 56, 381/57, 58, 59, 60, 71.14, 71.1, 71.2, 71.3, 381/71.4, 71.5, 71.7, 71.11, 71.12, 71.13, 381/73.1, 94.1, 92, 78, 80, 81, 119, 120, 381/122, 123, 104, 107; 340/425.5; 434/48
See application file for complete search history.

(56) References Cited

U.S. PATENT DOCUMENTS

| 2,791,630 | A | * | 5/1957 | Klug ................................ 381/86 |
| 4,075,438 | A | * | 2/1978 | Kappel ......................... 381/301 |
| 5,237,617 | A | | 8/1993 | Miller ............................ 381/61 |
| 5,371,802 | A | | 12/1994 | McDonald et al. ............. 381/71 |
| 5,515,726 | A | * | 5/1996 | Welsh .............................. 73/571 |
| 5,820,442 | A | | 10/1998 | Helder .......................... 446/404 |
| 6,275,590 | B1 | | 8/2001 | Prus ................................. 381/61 |
| 6,356,185 | B1 | | 3/2002 | Plugge et al. .............. 340/384.3 |
| 6,592,375 | B2 | | 7/2003 | Henry et al. .................... 434/62 |
| 7,188,005 | B2 | | 3/2007 | Toba et al. ........................ 701/1 |
| 7,253,746 | B2 | | 8/2007 | Maekawa et al. ............. 340/903 |
| 7,302,062 | B2 | | 11/2007 | Christoph ........................ 381/57 |
| 2003/0235316 | A1 | * | 12/2003 | Chambers et al. ............. 381/119 |
| 2005/0209056 | A1 | * | 9/2005 | Daly et al. ...................... 482/52 |
| 2006/0074645 | A1 | * | 4/2006 | Tischer ......................... 704/226 |

FOREIGN PATENT DOCUMENTS

WO    WO 90/13109    11/1990

* cited by examiner

*Primary Examiner* — Vivian Chin
*Assistant Examiner* — Leshui Zhang
(74) *Attorney, Agent, or Firm* — John H. Miller (57) ABSTRACT

Methods, systems and storage media are disclosed for enhancing the sounds of any vehicle, motorized conveyance, vehicle simulator, video game or vehicle like device by feeding the output of a playback device of the invention fed by a storage medium of the invention containing signals including one or more sounds of an operating DEV of choice and a signal indicating the RPM of the operating vehicle, motorized conveyance, vehicle simulator, video game or vehicle like device into one or more speakers and/or headphones. DEV's (Driving enthusiast vehicles) includes performance vehicles, race cars, trucks, tanks, motorcycles, power boats and the like. Using the invention, a driver or passenger is able to produce, inside the passenger compartment of any vehicle, etc., the sounds that a DEV makes at the corresponding RPM's of the separate engines.

19 Claims, 3 Drawing Sheets

VEHICLE SOUND ENHANCING SYSTEM AND METHOD OF PRODUCING

The invention involves a system that enhances one or more of the various sounds of various parts of motorized conveyances and vehicles during their operation and a method of producing sound enhancing media for playing in other motorized mechanisms and vehicles for the pleasure of the occupant(s).

BACKGROUND

Beginning about, or at least gaining popularity, in the early 1950's, driving enthusiasts, particularly younger driving enthusiasts, removed the factory muffler and installed "glass packs" or other aftermarket mufflers that enhanced the sound of the exhausts, particularly when accelerating from a stop or a low speed. Many didn't stop there, but went further to split the manifold(s) or to install headers to be able to install a second exhaust pipe, glass pack and tail pipe producing true dual exhaust, better known then as "a set of pipes". Some of those sets of pipes had a very sweet sound, particularly to anyone who happened to be in the vicinity when the vehicle was accelerating, a sound that is rarely heard today. The closest thing to it heard today is a Harley Davidson®, but its sound is much harsher and louder. Nevertheless, one of Harley Davidson's® top selling features is it's exhaust sound.

Also, in the 1950's and 1960's it became popular to add sets of louvers to the hood, not only for looks, but also to allow the engine sounds to be better heard by the people in the vicinity, including the driver and passengers, particularly at high RPM's. At that time, vehicle air conditioning was rare and the front windows were rolled down during driving much of the time allowing the sounds of the vehicle to be better heard.

These sound enhancing features increased the sensual thrills and fun of driving, but usually sounded better to those outside the vehicle on the sidewalks, etc. than they did to the driver. Due to the Doppler effect and the interference of the passenger compartment, the driver never experienced the full potential of the enhanced sounds. This was before the time of air conditioners in the car and driving enthusiasts drove with the windows down even when the temperature didn't favor that, just to better experience the sounds of the pipes and the engine. Alas, now with air conditioning, terrible wind noise with the windows down and even better sound deadening in the passenger compartment, one can barely hear the engine and usually not the exhaust.

Many cars today appear to have dual exhaust, but most are not true dual exhausts, just two tailpipes coming from a common catalytic converter or muffler. Also, most mufflers do a good job of hiding the exhaust sound and do not give the enthusiasts what they want to hear. A few auto manufacturers have modified their mufflers to provide a deeper, throaty and louder sound, but still the normally closed and well insulated passenger compartment prevents the full excitement of the improvement. Maybe because the driver can no longer really enjoy his pipes, few bother to replace their factory mufflers with better sounding ones, and few such options exist today for that reason. Almost no one goes to the expense of adding louvers to the hood.

Convertibles and roadsters have enjoyed a real come-back in recent years, probably because the driver, and passenger, can better experience the thrill of the sounds of performance. But alas, even they loose some to much of the potential thrills due to wind noise and Doppler effect, and rainy or cold weather. These are very old problems as most, maybe all, auto enthusiasts will agree. Many years ago a company named Ronco® marketed a product called Mr. Microphone® that contained a microphone and allowed a person or persons to broadcast on a predetermined FM frequency their voice(s) to the auto's FM radio when it was tuned to the same frequency, but while people had fun with this device, it did not solve or reduce the problems described above. Even today, Volkswagon® offers a device that permits an electric Guitar, etc. to be played through the auto's audio system, but this device also does not solve or reduce the problems described above.

Automakers are in a highly competitive performance environment. They have been steadily increasing the horsepower of their high-performance vehicles, hoping this will have a halo effect on the entire brand. For instance, Dodge advertises its "Hemi" engine. BMW features its "M" series. Nissan/Infiniti has added an additional exhaust sound to their sports models, with a sound-effect that is prominent in their advertising. These are just a few examples of many that try to differentiate via enhanced performance or the impression or reputation thereof.

SUMMARY

In the current auto market, automakers need any edge that further establishes their performance credentials. This invention, an ability to truly listen to the sounds of various engines, types of engine exhaust systems, and optionally brakes and wind noises, will enhance the customers' and potential customers' perception of the vehicle and/or the vehicle's audio system in important ways.

The present invention brings a solution to the old and new problems described above by way of a system that first records at least one operating sound from a driving enthusiast type of vehicle or motorized conveyance, hereafter referred to as a DEV. A DEV is a vehicle that driving and/or vehicle enthusiasts would like to own, or at least would like to have their vehicle(s) sound like, at least some of the time. The driving or vehicle enthusiast can be a driver and/or a passenger. The invention also allows the enthusiast to play a recording or stored memory of one or more DEVs, experiencing one or more of the desired sounds through an audio system in the passenger compartment of any vehicle containing a system of the invention while the vehicle is performing, simulating or very nearly simulating the sounds of selected DEV.

This invention will also allow drivers and enthusiasts to have a natural sense of their vehicle, improving their ability to drive in a high-performance fashion. Essentially, what's known as "road feel" will now also have an enhanced audio component. Imagine a drivers being able to tune their vehicle's stereo/audio system to the sounds emanating from a DEV of their choice at the same or similar engine RPM of the vehicle they are driving.

The invention comprises a method and system for recording one or more vehicle or conveyance sounds of one or more, typically various sounds of a DEV of choice, the DEV's having a variety of different exhaust systems, engine types and other vehicle characteristics affecting the sound(s) of operating DEV vehicles and conveyances, while also recording the RPM level and optionally the rate of RPM change of the engine in the DEV vehicle or conveyance being recorded. The recording(s) are on, or are then transferred to, a media that can be played back in any vehicle, virtual vehicle and simulated vehicle equipped with a player that is controlled with either an input of the tachometer in that vehicle or a programmed or generated engine RPM signal in the virtual vehicle and/or a simulated vehicle. The recorded media can then be duplicated in known ways to provide the same-kind of media or other media for playing in the player, player system and another method of the invention. A virtual or simulated vehicle can be a vehicle simulator, arcade device, video game and like devices that simulate a vehicle, boat, ATV, motorcycle, motor scooter, skimobile, tractor, or other motorized system.

With this invention, a person or persons can experience the sounds of a DEV vehicle of their choice even though the vehicle or virtual vehicle the person is operating or riding in is a different vehicle. For example, the person may be driving a family sedan with a V6 engine having a normal exhaust system, but using the invention can experience the sounds of a high performance DEV engine and a dual exhaust system having gutted, tuned or glass pack mufflers or straight pipes with no mufflers like a Formula 1 race car. Using this invention, a quiet, normally performing vehicle can still provide the driver and/or occupants with the sounds of a much more expensive and high performance vehicle, responding to the RPM's and optionally the rate of change of RPM's, of the less expensive or more normal vehicle being driven, even if the vehicle is using an electric engine, 3-6 cylinder engine or even a normal or high performance V6, V8 or larger engine. The invention is also useful in high performance vehicles having noise suppressing components like normal mufflers and sound deadening insulation protecting the passenger compartment from engine noise, exhaust noise, brake noise and wind noise.

The DEV's to be recorded will usually have an internal combustion engine, preferably a high performance engine of any number of cylinders, but usually at least 4, either no muffler at all or at least one noise enhancing muffler such as a gutted, tuned or glass-pack type muffler, at least one sound sensor and a device for feeding the signal(s) from the one or more sound sensors to a recorder for recording one or more high performance sounds being sensed by the one or more sound sensors, such as one or more microphones, located to capture the sounds as they might sound like to a person riding along beside or behind the vehicle. The recorder in the system of the invention recording the one or more sounds picked up by the one or more sound sensors also comprises an input from a tachometer in the DEV being recorded and a capability to record the RPM level continuously along with the sound(s) input(s) from the sound sensor(s)m and optionally the rate of change of the RPM. The DEV(s) to be recorded are a matter of choice, but normally would be modified as described above and later below. The recording media can be any known type including a reel to reel tape, a cassette tape, a CD, DVD, a hard drive or any solid state digital storage device or what ever might be available or developed later to record this type of information.

One method of the invention also includes a method of making a recording of a DEV equipped as described herein. The DEV can be operated in any manner during the recording process, but need only to be started up, optionally revved up to a high RPM and allowed to come back to an idle or put into the desired gear and accelerated to a maximum recommended RPM and then braked to a sudden stop or to a normal stop, or run through the gears from a stop to a high speed exceeding 80-100 miles per hour. If the DEV has a manual transmission, or a manual automatic, then it is desirable to run through most or all the gears while revving to a high RPM. Another option is to decelerate by gearing down through all or most of the gears, particularly if the sound(s) of one or more of the brake calipers are not being recorded.

The user of one or more of the recordings will select the recording of the DEV type (engine, exhaust system, body shape, transmission type, brake type, etc.) of his choice and play the recording while driving or riding in any vehicle equipped with a player that will respond to the RPM level in that vehicle to feed the proper signal from the recording to speakers in the vehicle or to one or more headphones set or both. The recording player will receive a signal from the tachometer in the vehicle and respond to that RPM level of the vehicle, and optionally the rate of change of the RPM level, to move the pickup on the recording to the place on the recording having the same or very similar RPM level, and optionally the same or very similar rate of RPM change, to allow the driver and/or passenger(s) to experience the sounds of the recorded DEV at its corresponding RPM level while driving a completely different sounding vehicle. By very similar is meant within a range of ±15 percent, more typically within ±10 percent and most typically within ±5 percent or less of the RPM level.

Optionally, the DEV system being recorded can contain two or more sound sensors, two or more optional signal switches or a selector or a blending switch, an optional mixer, an optional amplifier and a device to feed the audio signal(s) from the mixer and/or amplifier to the recording device. The terms "vehicle", "motorized conveyance" and "DEV" includes automobiles, SUV's, recreational vehicles, snow mobiles, ATVs, trucks of all kinds, busses, motorcycles, motor scooters, tractors, military vehicles and tanks, airplanes, speedboats and other similar vehicles.

Some examples of a vehicle sound recording system for recording sounds of a DEV and its environment comprises the recording device and two or more sound sensors including one or more sound sensors close to an engine exhaust outlet, two sound sensors for a dual exhaust system, one or the previous plus one or more sound sensors close to the engine with or without one or more sound sensors close to a wheel brake caliper and optionally one or more sound sensors close to the front of the vehicle to pick up wind rapid air movement sounds and one or more sound sensors elsewhere on the exterior to pick up environment sounds like street, country or ocean-side, and other desirable location sounds. Any of these sounds can be enhanced, up or down in magnitude, by running them through a mixer or other enhancing device. In these, or other embodiments, the amplified audio signals from the exhaust outlets can be fed to only rear speakers, i.e. speakers located behind the driver's ears, optionally along with audio signals from near one or both rear wheel brakes/calipers and, optionally, an amplified signal from the engine, and further optionally, from near one or both front wheels, can be fed to front speakers. The system can also record in stereo so that the left side sounds from the left side sound sensors are heard from the speakers on the left side of the vehicle and the sounds from the right side of the vehicle are heard from the speakers on the right side. The system of the invention can also comprise one or more mechanisms to move the sound sensor(s) physically when desired to enhance the sounds, e.g. the sound sensor(s) can be withdrawn to a protected or more esthetic position when not in use and then moved to a location where the sound is more desirable when in use.

Many modifications are possible and one modification is to feed the amplified signal from the left side exhaust to the left rear speaker and the amplified signal from the right side exhaust to the right side rear speaker. Additional modifications include feeding the amplified signal from near, or in, the engine to one front speaker and the amplified signal from in or near a front brake caliper to a different front speaker on the opposite side of the passenger compartment.

The invention also includes a method of, and one or more systems for enhancing performance sounds of the DEV for making the recording by mounting a sound sensor close to one or more engine exhaust openings of a vehicle, feeding the signal from at least one sound sensor to a mixer or a mixer-amplifier combination or to a amplifier that is part of the an existing stereo system in the vehicle (including an amplifier built into the speakers), and then to one or more speakers of a sound system in the vehicle, or to a separate sound system that can be, or include, a set of headphones. It is desirable if the sound system is a stereo system, but a mono system is also satisfactory. A stereo system is particularly nice when two sensors are used and one sensor is near a first opening of the exhaust system and the other sound sensor is located near a second opening of the exhaust system of the vehicle, or near a location on the engine where the sound of the revolutions of the engine or air streaming into the air intake is particularly evident. When the vehicle has dual exhaust, a third sensor, and more sensors if desired, can be mounted at desired points near the exhaust outlets and near the engine. Also, a sensor can be mounted near one of the brake calipers to pick up the sounds of the brakes slowing the wheel. Other sensors can be mounted at other locations in or on the vehicle to pick up other desired sounds, such as air passing over a surface that causes a desired sound, another part of the engine, etc. The method of operating the system comprises selecting the sound sensor signal(s) to feed to the amplifier, optionally positioning the sensors for a desired result, optionally mixing or selectively adjusting one or more signals to feed to the amplifier and adjusting the overall sound level in the audio system and optionally balancing the speakers to achieve the desired sound(s).

When using two or more sound sensors on the vehicle being recorded, optional switches can be used to listen to and/or record two or more signals coming from the sound sensors or any combination and/or from an optional mixer, like that used to blend different sound frequencies in Hi-Fi/stereo systems or different musical instruments in a band, can be used by the driver or passenger to blend sounds coming from different sound sensors. Switches are not normally required when using a mixer because the mixer acts to vary the level of each signal including shutting it off completely.

As used herein, the term sound sensor means any item that picks up sound and converts it to a signal that when, optionally amplified and, fed to a recorder or speaker, reproduces the sound sensed. The term includes all kinds of microphones and equivalents thereof. Also, the term media, as used herein means any recording or storage medium that captures data or translated information or signals representing one or more sounds and the RPM of an engine or RPM of a part of a drive system of a DEV, a motorized conveyance, or a device containing a motor and includes such storage mediums a record, a tape, a CD, a DVD, a hard drive, a solid state data storage device and other storage mediums that provide the same or similar function.

The methods of the invention are especially desired when driving and recording a DEV, or when driving any vehicle containing a playback system of the invention, where frequent stops, starts, and acceleration are being experienced, such as in commuting, and especially when touring on hilly, curvy, roads where braking and accelerating are being experienced and also on a drag strip or equivalent where the DEV, or any vehicle containing a playback system of the invention, can accelerate from a dead stop to full or near full speed, shifting through the gears during the dash.

The invention also includes a storage medium containing a recording or information or data representing one or more sounds of a DEV and also a signal indicating the RPM, or near RPM, of the engine, or a part of he drive system, in the DEV corresponding to the one or more sounds recorded. The storage medium includes a record, tape, CD, DVD, hard drive, solid state storage device and equivalents thereof. By a part of the drive system is meant to include items like a moving engine part, a driveshaft, a gear, a wheel or any part of the drive system that reflects the RPM of the engine in the DEV producing the one or more sounds, or any vehicle, motorized conveyance or simulated motorized conveyance in which a playback system of the invention is contained or a part of. The term engine includes motor as in motorized conveyance.

The invention also includes methods of, and one or more systems for enhancing performance sounds of any vehicle or motorized conveyance or motorized system, or a simulation thereof. The invention includes a media player for playing back any media containing one or more recorded sounds of a DEV, the player also receiving a signal indicating the RPM's of the engine (motor) in the vehicle or motorized conveyance or motorized system, real or simulated, in which the player is located. The invention also includes systems comprising the player of the invention, one or more optional amplifiers, one or more speakers, and/or one or more headphones that will reproduce, within the capability of the one or more parts of the system(s), the recorded sounds of the DEV. The invention also includes methods of enhancing the sounds of any vehicle or motorized conveyance or motorized system, or a simulation thereof, by operating the media of the invention in any player of the invention or player systems of the invention, or equivalent devices to reproduce or nearly reproduce the sounds of a DEV.

In addition to the advantages of using a recording of any DEV of choice and a modified playing device according to the invention, one using a feed from a tachometer in the vehicle, to cause any vehicle or simulation thereof, to sound like the DEV of choice, it appears that the power plants of autos and trucks, and later other vehicles, are moving in the direction of either small, 2-4 cylinder internal combustion engines and/or electric motors, all of which do not make sounds thrilling to automobile or driving enthusiasts. This invention will be an even more important too those types of vehicles and enthusiasts forced to drive such vehicles.

When the terms "recording" or "recorded information" is used herein these terms are meant to include any item that is compact such as a media or information storage device that can store the sound signal information and the information coming from the tachometer and is capable of being played, i.e. like a record, tape, CD, DVD, hard drive, solid state memory device, other compact information storage device and variations and equivalents thereof. The initial media or information storage device used to capture signals from the DEV is capable of being reproduced to produce any number of same or similar media or information storage devices for playing back, in a playing device made or modified according to the invention to respond to a signal from the tachometer in the vehicle, motorized conveyance or simulated motorized system such that the recorded DEV sounds, with or without enhancement during recording, can be reproduced, or suitably reproduced on an audio system in the vehicle, motorized conveyance, simulated vehicle, video game, portable radio, Ipod, etc. and modifications or equivalents thereof. Recording media has changed a lot in the past 10-15 years and is likely to continue changing and new media and recorders for creating and playing the new media can be used in the systems of the invention.

By tachometer is meant any device that can detect the revolutions per minute (RPM) of an engine or any moving part of the engine or drive system in the DEV and in the vehicle in which the recording is being played, or simulation in the vehicle simulator or video game, etc. and feed a signal of the RPM to the recording device or the playing device, via wires or wireless transmission. By near or similar RPM is meant typically within ±5 percent, more typically within ±3 percent and most typically within ±2 percent or less of the actual RPM of the engine or RPM signal.

When the word "about" is used herein it is meant that the amount or condition it modifies can vary some beyond that stated so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept, the objectives of the invention and embodiments disclosed, including the best mode known to the inventor, the inventor and others can, without inventive effort, explore beyond the limits disclosed using only ordinary skill to determine if the invention is realized beyond those limits, and when embodiments are found to be without any unexpected characteristics, those embodiments are within the meaning of term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF SOME EMBODIMENTS OF THE INVENTION

Figure 1:
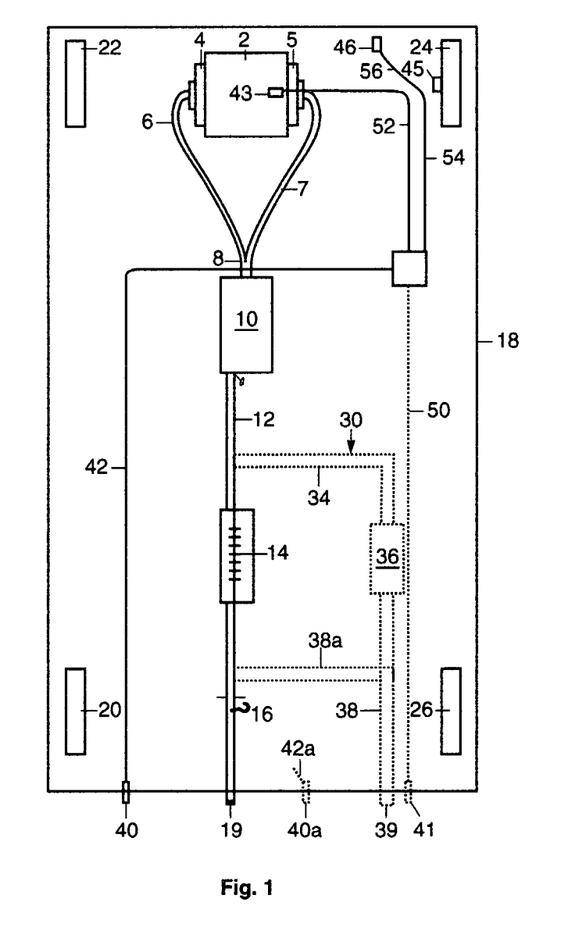
FIG. 1 is a partial plan view of a DEV chassis showing an engine, an exhaust system and brake calipers and a part of the system of the invention for making a recording of the sounds of a DEV.

FIG. 1 is a partial plan view of a DEV chassis containing an engine 2, having two exhaust manifolds 4,5, exhaust pipes 6,7 communicating with the exhaust manifolds 4,5 respectively and joining into a single exhaust pipe 8, an optional catalytic converter 10, a second exhaust pipe 12, a muffler 14, a tailpipe 16 and 4 brake calipers 20,22,24 and 26. A frame, and other parts not part of the invention, holding and cooperating with the engine 2 and brake calipers 20-26 in the operation of the vehicle are not shown, but are well known. The general outline 18 of the body of the vehicle is usually not involved in the system to be recorded and can vary tremendously in shape as is well known.

The engine exhaust systems shown in FIG. 1 are traditional exhaust systems. As is known, when the engine is not a V-4, V-6 or V-8 or higher cylinder engine, the engine normally comprises only one exhaust manifold and one exhaust pipe leading to an optional catalytic converter, but normally required now on most vehicles, or to a muffler. A couple of example of an in-line engine DEV that would be desirable for recording would include a Duesenberg automobile or racer, an Offenhauser race car, a truck, a tractor, etc. The invention is also applicable to such engines and exhaust systems.

The system of the invention used on the vehicle of FIG. 1 comprises a sound sensor 40 mounted close to the exhaust outlet 19 and a device for sending a sound signal to an optional mixer 47 (FIG. 2) or an optional amplifier that can be fed to a recorder, preferably one that will record in stereo. The sound sensor 40 can be a microphone and the device for sending can be one or more wires or a transmitter, as will be described in more detail below.

Figure 3:
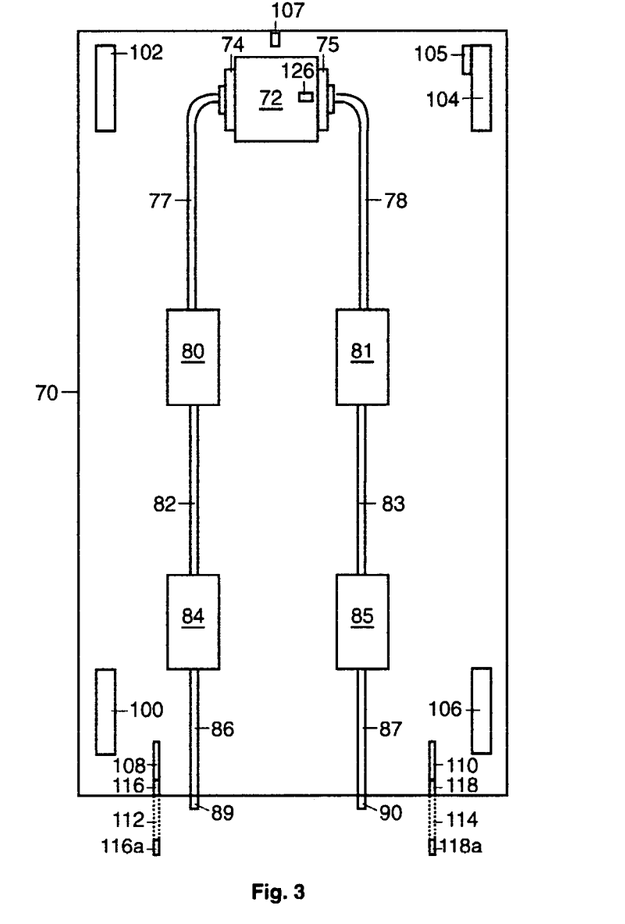
FIG. 3 is a partial plan view of a DEV chassis having an engine, a real dual exhaust system, brake calipers and an optional system of the invention for picking up sounds of the DEV for recording and optionally listening prior to and/or while recording.

Also shown in FIG. 1 is an optional "so called" dual exhaust system 30 that technically ends in a second exhaust outlet 39, but lacks a second complete exhaust system from the engine 2 to the outlet 39, like the true dual exhaust system shown in FIG. 3. This "so called" dual exhaust system 30 can comprise either a second exhaust pipe 34, an optional second muffler 36 and a second tail pipe 38 ending in a second exhaust outlet 39, or alternatively only a second tailpipe 38a, ending in the second exhaust outlet 39. In these embodiments a sound sensor 40 is mounted to be located near the first exhaust outlet 19, that can be one either side of the exhaust outlet 19 including in the center of the back of the DEV as shown as 40a. In the embodiment having a second exhaust outlet 39, a second sound sensor 41 can be located close to that exhaust outlet 39, or a single sound sensor 40 or 40a, or in any position, can serve to pick up the sound for both exhaust outlets 19 and 39. In the embodiments shown in FIG. 1, at least one sound sensor 43 can be mounted to be in a position to detect the sound of the engine 2 and also, optionally, another sound sensor 45 can be mounted close to one or more of the brake calipers 24,26,22,20. Optionally, another sound sensor 46, can be mounted to catch the sound of air rushing into or past the DEV, such as in or near the front of the DEV, can be used. Any sound sensor suitable for use in harsh or outside conditions can be used in the present invention for making the recordings. The sound sensor(s) used need not be resistant to extremes of hot or cold or salt or water if the DEV is being recorded in dry, temperate weather.

Any microphone or other sound sensor, suitable for the environment and having the capability of capture a frequency range of about 100-10,000 Hz, more typically about 50-15,000 Hz and most typically from about 20 Hz or lower to at least about 20,000 Hz is suitable for use in the invention. Desirably, but not necessarily due to the short duration on any particular DEV, the microphone should be able to withstand water, salt water normally found on streets after a snow or ice storm and to withstand temperatures from at least about −20 degrees F. to about 130 degrees F. or higher for the microphone placed near the engine.

Some suitable microphones suitable for use in the present invention include the HLSC 1, HLSC-2 HighLine, HLSC-3 Croakie, Combo 4 and MM-BSM-9 available from Microphone Madness Of Palm Coast, Fla., Solo® Executive System available from Revolabs, Inc. of Maynard, Mass., Long Ranger III with M119 Lavalier microphones available from Lectronics, Inc., Sennhieser's MKH 418S, Sony's ECM 719, Shure Pro Audio's SM 63, and Professional Sound Corporation's SGM 1, to name a few. The microphones can be wireless or connected to the system with transmission wires. Various voltages can be used with the microphones, but 12 volt is favored because of the ease and cost of using the vehicle's 12 volt system as the power source. It is desirable to mount the microphone(s) for picking up the exhaust sound from one or two exhaust outlets on the end portion of a power radio antenna so that the microphone(s) can be located at a near optimum location for picking up the exhaust sound when the system of the invention is in use, but withdrawn to a safe, non-obtrusive location under the DEV when the system of the invention is not in use. Any power antenna can be used including a Pyramid EA 48 available from Ace Photo and Digital (acephotodigital.com/index.asp) and a Legacy™ LN 46 Fully Automatic Power Antenna available from ST Great Deals (sjgreatdeals.com).

Figure 2:
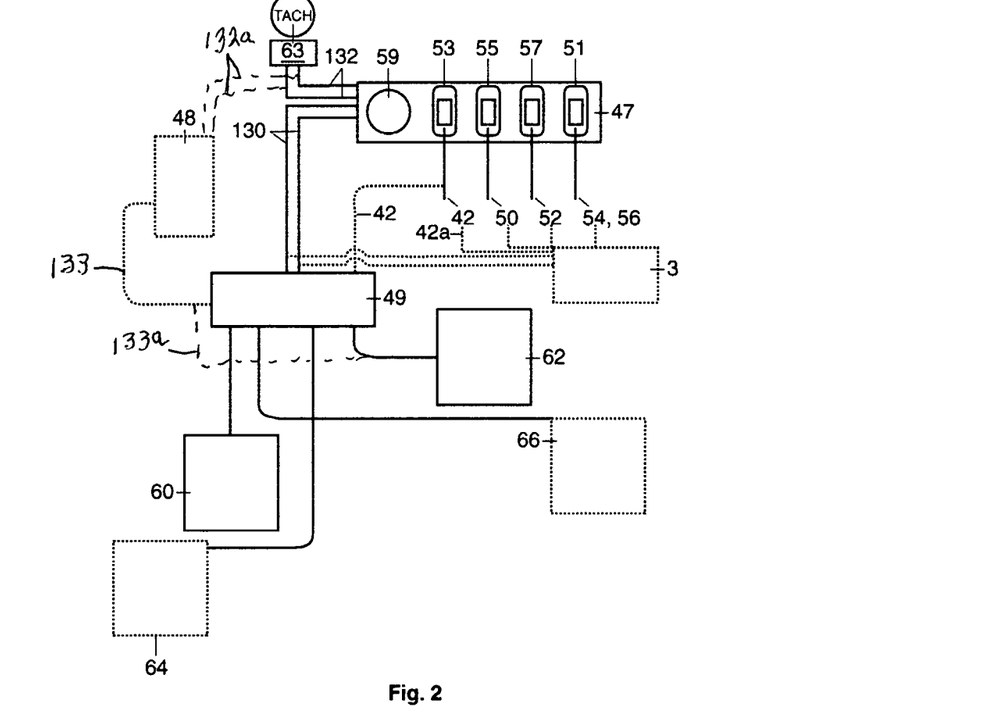
FIG. 2 is a schematic of systems of the invention for enhancing and recording, and optionally listening to, the sounds of a DEV.

FIG. 2 shows a schematic of a typical sound enhancing and recording system embodiment for use in invention. The one or more sound signals from one or more of the sound sensors used can be transmitted to an optional mixer 47 with either wires 42a, 50, 52, 54, 56, and others depending upon the number of sound sensors being used, or transmitted as a remote signal to the mixer 47 in a known manner, such as by using a Long Ranger III or IV system available from Lectrosonics, Inc. of Rio Rancho, N.Mex., a Fender Passport Deluxe PD 250 system available from the Fender Musical Instruments Company of Corona, Calif. The mixer 47, in this embodiment, is a 4 or more channel mixer with signal adjusters 51,53,55 and 57 that can be moved to adjust the signal level of each of the microphone inputs to produce an output signal having the desired mix according to the person(s) listening. A volume control 59 on the mixer can control the level of the signal going to the rest of the system. In any of the embodiments of the invention, the signal going to the recorder can optionally also be fed to an audio system so that the driver and/or the person driving and, alone or with one or more others, doing the recording can achieve the sounds that are desired for the recording.

If only one sound sensor is used in the system, the sound signal can be transmitted directly to either an amplifier 49, a recorder 63 (FIG. 2) or both a combined amplifier and recorder for recording and/or driving one or more speakers in the DEV, either optional speaker(s) 60,62, optional speakers 64,66 that are part of the built-in radio/cassette/CD system of the vehicle or to one or more separate speakers (not shown), or to a recorder of the invention only recording on a storage medium. The DEV can also contain an optional playback device 48 of the invention receiving a signal from the tachometer in the DEV according to the invention that will allow the playing back of the storage medium earlier recorded to determine whether the recording is suitable, i.e. meets expectations of the recording operation on the DEV. The output 133 of the playback device 48 can be fed into an amplifier for feeding one or more of the speakers, or optionally can be fed directly to one or more of the speakers via line(s) 133a.

The separate speakers in any of the embodiments, DEV and/or the vehicle, etc. in which the recording is being played, can be one or more portable speakers located in the vehicle, one or more sets of headphones, one or more speakers located in the one or more of the headrests, in the top portion of the driver's seat, on the back floorboard or in other conventional locations. It is sometimes desirable to have a system of the invention separated from the vehicle's built-in audio system so that music or other broadcast program can be heard in addition to the desired vehicle sounds.

As shown in schematics of systems of the invention shown in FIG. 2, when two or more sound signals are being picked up, those signals can be fed to the mixer 47 where the level of each signal can be adjusted by the driver or passenger to provide the desired sound effect and the resultant mixed signal then fed to the recorder 63 and optionally to an optional amplifier 49 and then on to either the recorder 63 and/or the built in vehicle audio system and/or to separate speakers, headphones, etc. The level of the sound and balance between the speakers can be adjusted either on the amplifier 49 or the built-in audio system in the vehicle. Of course, the mixer 47 and amplifier 49 can also be built in or integrated into the built-in audio system in the vehicle. Any reasonable mixer is suitable for use in the system of the invention and 12 or 9 volt mixers particularly suitable are the RMS 4-Channel Personal Stereo Mixer and the RMS 4 Channel Micro Mixer RMM 290 available from Get-It-All.net. Using components that use a 12 volt power supply are advantageous because they can be run by the vehicle's 12 volt electrical supply system.

Many more mixers are available that require 120 volt power supply and these can be used by including in the system a 12 volt to 120 volt inverter which are readily available. One of many such inverters that are suitable is the Monster Cable MCPI-150 Mobile Power Station available from ShopTronics.com. This inverter delivers 150 watts of power and higher power output inverters can be used if desired. One of many suitable 120 volt mixers suitable for use in the system of the invention is the Sampson MDR 1064 Compact Mixer available from Sampson Technologies Corporation of Hauppauge, N.Y.

Figure 4:
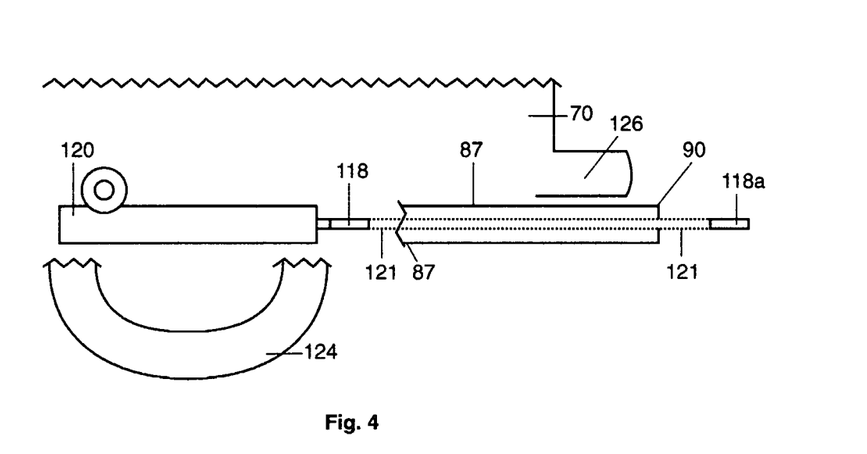
FIG. 4 is a partial side view of the rear of a DEV showing an optional feature of a typical embodiment of the invention for recording the exhaust sounds of a DEV.

A most typical embodiment for producing one or more sound signals from a DEV for recording is shown in FIGS. 3 and 4. The engine exhaust system of this embodiment is a true dual exhaust system. FIG. 3 is a partial plan view of a vehicle chassis 70 containing an engine 72, having two exhaust manifolds 74,75, exhaust pipes 76,77 communicating with the exhaust manifolds 74,75 respectively and feeding two optional, but normally required by law, catalytic converters 80 and 81. Second exhaust pipes 82 and 83, and mufflers 84 and 85 respectively, including gutted, tuned or glass-pack mufflers. Exhaust tailpipes 86 and 87 direct the exhaust from the mufflers 84 and 85 respectively to exhaust outlets 89 and 90 that can be the end of the final tailpipes 86 and 87 or ornamental exhaust tips or extensions (not shown, but well known). The chassis also includes brake calipers 100,1022, 1044 and 1066. A conventional frame, and other parts, not part of the system of the invention, holding and cooperating with the engine 2 and brake calipers 100-106 in the operation of the vehicle are not shown, but are well known. The general outline 70 of the body of the vehicle is not part of the invention and can vary tremendously as is well known.

The system of the invention used on the DEV of FIG. 3 used for making recordings comprises sound sensors 116 and 118 mounted under the vehicle when not in use, but movable to be close to the exhaust outlets 89 and 90, see 116a and 118a, when the system of the invention is turned on. Any reasonable mechanism for moving a microphone can be used in this embodiment, but shown in FIG. 4 is an automatic motorized antenna mechanism 120, antenna 121 and the wireless microphone 118,118a in the home and working positions respectively, the latter in a desirable position with respect to the exhaust outlet 90 to capture the rich sound of the exhaust. Any reasonable motorized antenna can be used in this embodiment to move the microphones, including a Pyramid™ EA 48, available from acephotodigital.com/index.asp, and a Legacy™ LN 46, available from stgreatdeals.com. Wired microphones can be used in this embodiment too, but a wireless device is preferred. The motorized antenna 120 and microphone 116,118 can be mounted in a protected area, such as between the back wheels 124 and below the body pan beneath the back seat, and then the microphones 116,118 are moved out beneath the rear bumper 126 to operating positions 116a, 118a when the system of the invention is turned on, or, alternately when a separate switch for the antenna is turned on.

Like the embodiments shown in FIG. 1, this embodiment of FIG. 3 has another sound sensor 126 mounted close to the engine 72 and also, if desired, another sound sensor 105 can be mounted close to one of the brake calipers 100,102,104, 106, in this embodiment in a protected location close to the inboard side of brake caliper 104. If desired, another sound sensor 107, is mounted to catch the sound of air rushing into or past the body, such as in or near the front of the vehicle. Any sound sensor suitable for use in harsh or outside conditions can be used in the present invention, but in the embodiment shown in FIG. 3, the sound sensors are wireless microphones. The systems shown in FIG. 2 are used with this embodiment, particularly the system containing a mixer having at least 5 channels.

The selection of the type of DEV for making recordings is a matter of choice, but will normally be selected to make sounds desirable to driving enthusiasts and can include in addition to high performance automobiles other DEV's including motorcycles, trucks of all kinds, tractors, snowmobiles, ATV's, and non-vehicles including boats, snowmobiles, jet skis, chain saws, and any motorized machine that has an internal combustion engine. The driving enthusiast can then select which recording(s) he wants to use in his audio system so long as it has a tachometer equipped to feed the tachometer signal to the type of recorded media player that is capable of moving the recorded media or audio signal pickup to the same or similar RPM recorded on the media.

The type of recorder most typically used in the invention is most typically one that converts the sound (signals) produced by the DEV to one or more digital signals and then records or stores the digital sound signal(s) along with the digital signal or analog signal coming from a tachometer in the DEV. This can be stored on the recording or storage medium (media), or storage device like used in a control program in a conventional process or machine control programer. The type of player or play-back device most typically used in the invention is one that can use the RPM input signal (most typically digital) coming from the tachometer in the vehicle in which the player is located to match up with the same or very similar RPM signal recorded on the media so as to feed the corresponding DEV sound(s) signal to the speaker(s), headphone(s), etc. in the vehicle.

The player or playback device can be built-in to the vehicle, or can be a portable player or playback device that can be moved from vehicle to vehicle using either wires or FM transmitting to transmit the sound(s) signal directly or indirectly to the speakers. The player or playback device can also be a totally stand-alone portable unit 48 (FIG. 2) that connects to a signal coming from the tachometer (through a wire or transmitted wireless) in the vehicle to play the sound(s) on one or more speakers in the portable player unit or through headphones plugged into the portable unit.

Several embodiments of the invention have been shown in detail above, but, given the disclosure above, there are many obvious variations of these embodiments. The many embodiments disclosed above and these obvious variations of the embodiments disclosed are meant to be included in the following claims literally or as equivalents thereof. One example of such a modification to the disclosed embodiments is a playback system that includes a linear or non-linear multiplier for the signal indicating the RPM of the engine in the vehicle, motorized conveyance, vehicle simulator, video game or vehicle like device prior to that signal being fed into the playback device. This would allow the sounds of the DEV made at RPM's higher than the RPM's of the vehicle, motorized conveyance, vehicle simulator, video game or vehicle like device to be heard when the latter is being operated at lower RPM's. For example, when the storage medium is from a really high performance DEV like a racing vehicle, its RPM's may be recorded to 10,000 RPM's or higher while the vehicle, etc. can, or usually does, operate only up to a level in the range of about 3,000-5,000 RPM's. A non-linear multiplier could kick in, e.g. at around 1,500-2,500 RPM's, and from that point to higher RPM's play the sounds that are recorded from the DEV at much higher RPM,s at higher multipliers as the RPM's of the vehicle, etc. rises above the threshold of say 1500 RPM's or thereabout. Such linear and non-linear signal multipliers are well known and the playback systems of the invention can have one or more of each type of multiplier, and/or magnitude of multipler for the driver/passenger/simulator operator, etc. to select for various enhancement of choice.

When the term "CD" is used herein it means compact disc and when "DVD" is used herein it means digital video disc. There are many types of DVD's and all types are included in the invention.

The invention claimed is:

1. A method of producing a recording of one or more sound signals representing sounds of a Driving Enthusiast Vehicle (DEV) on a storage medium capable of being reproduced and/or capable of reproducing the one or more sound signals recorded when played in a playback device in a different vehicle or simulated vehicle that is also receiving an RPM signal representing a varying RPM of an engine or motor in the different vehicle or simulated vehicle, the playback device being in or on the different vehicle or simulated vehicle, the different vehicle having an electric motor or an internal combustion engine having four or fewer cylinders and the simulated vehicle being an arcade device or video game, the method comprising:
  a) feeding a DEV engine RPM signal coming from a DEV engine RPM indicator that indicates the RPM of an engine in the DEV, into a recorder making a recording on the storage medium while operating the engine in the DEV at various RPM's, the DEV engine RPM signal coming from the DEV engine RPM indicator varying as the RPM's of the engine in the DEV changes as the DEV is operated while in gears from a stop to a high speed that produces a high engine RPM, and
  b) simultaneously feeding one or more sound signals corresponding to engine exhaust sounds produced by an engine exhaust system of the DEV and optionally one or more other sounds produced by the DEV at corresponding DEV engine RPM's into the recorder, sound signals produced by the one or more other sounds selected from a group consisting of engine compartment, grill region, and a combination of these sounds of the DEV, the engine exhaust sounds of the DEV being sensed with one or more exhaust sound sensors attached to one or more mechanisms for moving the one or more exhaust sound sensors from a protected position away from a source of the engine exhaust sounds coming out of one or more tailpipes of the DEV to a position closer to the source of the engine exhaust sounds, the position closer to the source of the engine exhaust sounds being located beyond one or more ends of the one or more tailpipes of the DEV to a near optimum location for capturing the engine exhaust sounds as they would sound to a person riding along behind the DEV while the DEV is in use, the mechanisms for moving the one or more sound sensors being supported by the DEV.

2. The method of claim 1 wherein the one or more engine exhaust sound sensors are one or more microphones.

3. The method of claim 2 wherein two or more sound signals are first run through a mixer and an output of the mixer is the sound signal that is recorded.

4. The method of claim 2 wherein the one or more sound signals are converted to digital signals prior to recording.

5. The method of claim 2 wherein the storage medium is selected from a group consisting of a tape, a record, a CD, a DVD, a hard drive, a solid state storage device or a compact information storage device.

6. The method of claim 2 wherein the storage medium is selected from a group consisting of a tape, a record, a CD, a DVD, a hard drive, a solid state storage device or a compact information storage device and wherein the one or more mechanisms for moving the one or more microphones includes a motorized antenna.

7. The method of claim 2 wherein the DEV is a tractor or a snowmobile or an ATV or a boat or a jet ski or a chain saw or a Duesenburg, or an Offenhauser racecar.

8. The method of claim 1 wherein two or more sound signals are first run through a mixer and an output of the mixer is the sound signal that is recorded.

9. The method of claim 8 wherein the sound signal coming from the mixer is converted to a digital signal prior to recording.

10. The method of claim 8 wherein the DEV is a tractor or a snowmobile or an ATV or a boat or a jet ski or a chain saw or a Duesenburg, or an Offenhauser racecar.

11. The method of claim 3 wherein the DEV is a tractor or a snowmobile or an ATV or a boat or a jet ski or a chain saw or a Duesenburg, or an 25 Offenhauser racecar.

12. The method of claim 1 wherein the one or more sound signals are converted to digital signals prior to recording.

13. The method of claim 1 wherein the storage medium is selected from a group consisting of a tape, a record, a CD, a DVD, a hard drive, a solid state storage device or a compact information storage device and wherein the one or more mechanisms for moving the one or more engine exhaust sound sensors closer to the engine exhaust sounds includes a motorized antenna.

14. The method of claim 13 wherein the DEV is a tractor or a snowmobile or an ATV or a boat or a jet ski or a chain saw or a Duesenburg, or an Offenhauser racecar.

15. The method of claim 1 wherein the DEV is a tractor or a snowmobile or an ATV or a boat or a jet ski or a chain saw or a Duesenburg, or an Offenhauser racecar.

16. A system for enhancing one or more sounds of a vehicle, motorized conveyance, vehicle simulator, or video game comprising:
a) a playback device for playing a storage medium containing a one or more recorded sound signals and a recorded RPM indicator signal of a Driving Enthusiast Vehicle (DEV), the playback device being capable of putting out one or more signals for driving one or more speakers and/or one or more headphones, the storage medium comprising the one or more recorded sound signals representing the one or more sounds generated by the DEV, the one or more recorded sound signals also containing a simultaneous recording of an RPM indicator signal indicating an RPM of an engine in the DEV as the DEV was operated while in gears from a stop to a high speed that produced a high RPM, the storage medium being capable of reproducing the one or more recorded sound signals when the storage medium is played in the playback device or a player for playing the storage medium, the one or more recorded sound signals comprising the RPM indicator signal indicating revolutions per minute (RPM) of the engine in the DEV while the engine in the DEV was operated at various RPM's, the RPM indicator signal indicating the RPM's of the engine in the DEV changing as the engine was operated at various RPM's, and one or more signals produced by one or more sound signals of the engine exhaust of the DEV and optionally one or more other sounds produced by the DEV at the corresponding RPM's of the engine, the one or more other sounds selected from a group consisting of one or more sounds produced by or in an engine compartment, a grill region of the DEV, and
b) one or more linear and/or non-linear RPM indicator signal multipliers for the signal indicating the RPM's of the vehicle, motorized conveyance, vehicle simulator, or video game to allow sounds made by the DEV at higher RPM's than being produced by the RPM indicator of the vehicle, motorized conveyance, vehicle simulator, or video game to be heard.

17. The system of claim 16 wherein the one or more linear and/or non-linear signal multipliers are operable only above a predetermined RPM in the range of 1500-2500 RPM.

18. The system of claim 16 wherein the storage medium is selected from a group consisting of a tape, a record, a CD, a DVD, a hard drive, a solid state storage device or a compact information storage device and wherein the DEV is a tractor or a snowmobile or an ATV or a boat or a jet ski or a chain saw or a Duesenburg, or an Offenhauser racecar.

19. A method of enhancing the sounds of a vehicle, motorized conveyance, vehicle simulator, or video game comprising:
a) placing a storage medium of choice into a playback device that feeds one or more output signals to one or more speakers and/or one or more headphones in or near the vehicle, motorized conveyance, vehicle simulator, or video game, the storage medium containing a recording of signals comprising an RPM indicator signal indicating revolutions per minute (RPM) of an engine in a DEV while the DEV was operated at various RPM's while in gears from a stop to a high speed producing a high RPM, the RPM indicator signal indicating the RPM's of the engine in the DEV changing as the engine was operated at various RPM's, and further containing one or more sound signals produced by sounds of engine exhaust of the DEV produced by the DEV at the corresponding RPM's and, optionally, one or more other sounds produced by the DEV at the corresponding RPM's of the engine, the one or more other sounds selected from a group consisting of one or more sounds produced in an engine compartment and/or a grill region of the DEV and the playback device receiving the RPM indicator signal representing the RPM of the engine or simulated engine in the vehicle, motorized conveyance, vehicle simulator, or video game and producing an output that drives the one or more speakers and/or headphones, the one or more sound signals having been generated by one or more sound sensors supported on the DEV, and
b) operating the vehicle, motorized conveyance, vehicle simulator, or video game while using a linear or/and non-linear multiplier to multiply the RPM indicator signal representing the RPM of the engine or simulated engine in the vehicle, motorized conveyance, vehicle simulator, or video game to allow sounds made by the DEV at higher RPM's than being produced by the RPM indicator signal representing RPM of the vehicle, motorized conveyance, vehicle simulator, or video game to be heard through the one or more speakers and/or one or more headphones.

* * * * *